(12) United States Patent
Isaacs

(10) Patent No.: US 12,608,545 B2
(45) Date of Patent: Apr. 21, 2026

(54) VALIDATING GENERATIVE ARTIFICIAL INTELLIGENCE OUTPUT

(71) Applicant: Salesforce, Inc., San Francisco, CA (US)

(72) Inventor: Charles Hart Isaacs, Annapolis, MD (US)

(73) Assignee: Salesforce, Inc., San Francisco, CA (US)

( * ) Notice: Subject to any disclaimer, the term of this patent is extended or adjusted under 35 U.S.C. 154(b) by 163 days.

(21) Appl. No.: 18/417,468

(22) Filed: Jan. 19, 2024

(65) Prior Publication Data

US 2025/0238613 A1     Jul. 24, 2025

(51) Int. Cl.
*G06F 16/00*      (2019.01)
*G06F 40/284*      (2020.01)

(52) U.S. Cl.
CPC ................................. *G06F 40/284* (2020.01)

(58) Field of Classification Search
CPC .................................................... G06F 40/284
See application file for complete search history.

(56) References Cited

U.S. PATENT DOCUMENTS

| | | | |
|---|---|---|---|
| 2024/0202221 A1* | 6/2024 | Siebel .................. | G06N 3/0475 |
| 2024/0256582 A1* | 8/2024 | Jain ..................... | G06F 16/3329 |
| 2024/0281472 A1* | 8/2024 | LaRhette ............ | G06F 16/9558 |

* cited by examiner

*Primary Examiner* — Syed H Hasan
(74) *Attorney, Agent, or Firm* — Holland & Hart, LLP.

(57)      ABSTRACT

Methods, apparatuses, and computer-program products are disclosed. The method may include training a generative artificial intelligence (AI) model on a plurality of data sources and generating, based on the training, training log metadata indicating individual data sources of the plurality of data sources. The method may include receiving, from a user device, a generative AI query and generating, using the trained generative AI model and based on one or more data sources of the plurality of data sources, a response to the generative AI query. The method may include mapping one or more portions of the response to the one or more data sources of the plurality of data sources based on the training log metadata and transmitting, to the user device, the response and one or more indications of the one or more data sources based on the mapping and the training log metadata.

17 Claims, 9 Drawing Sheets

110-a 130-a 110-b 130-b 105-a 105-b 105-c 130-c 110-c 130-d 110-d

Data Center

120

140

Cloud
Platform

135

115

125

100

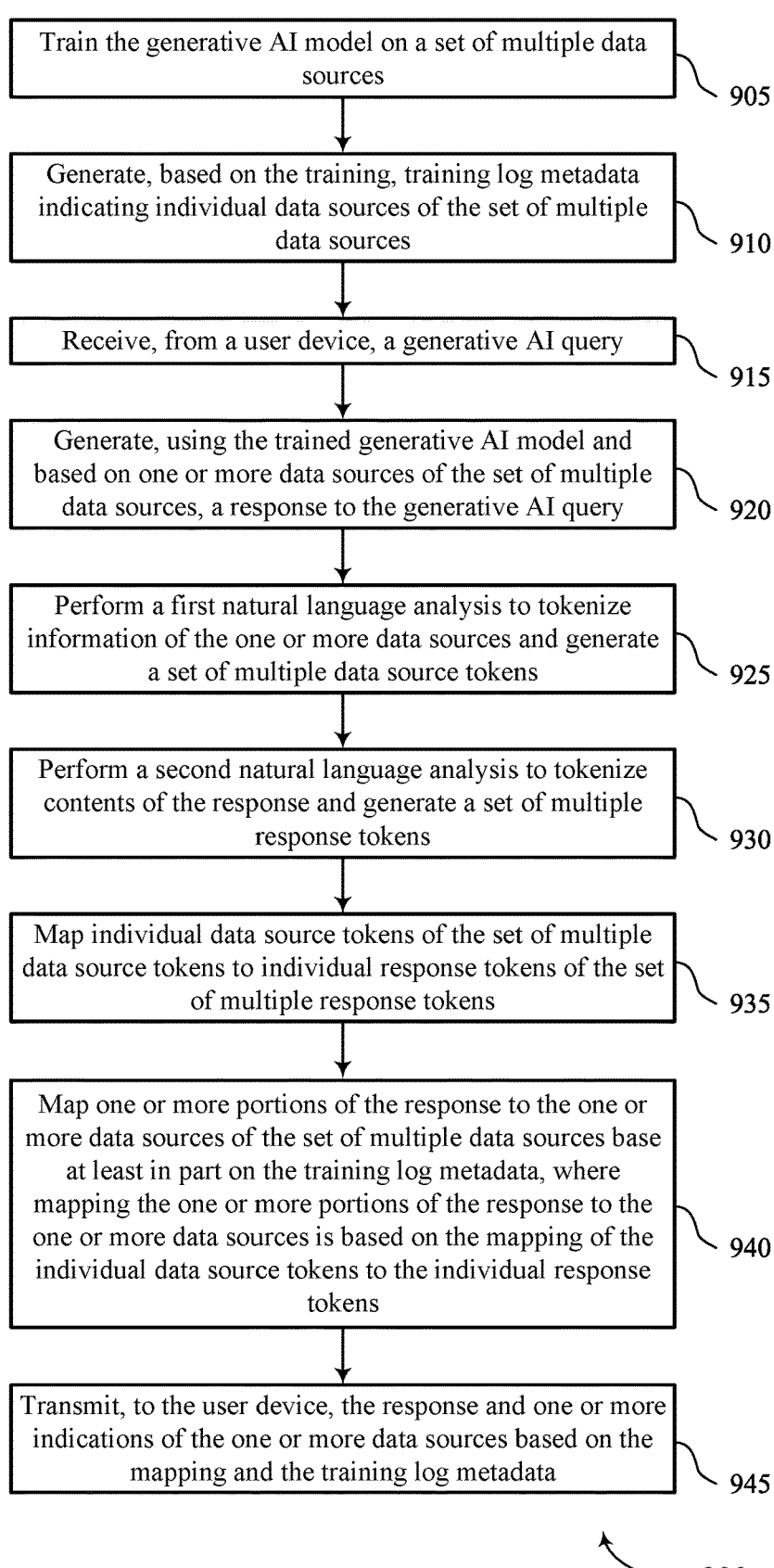

Train the generative AI model on a set of multiple data sources

905

Generate, based on the training, training log metadata indicating individual data sources of the set of multiple data sources

910

Receive, from a user device, a generative AI query

915

Generate, using the trained generative AI model and based on one or more data sources of the set of multiple data sources, a response to the generative AI query

920

Perform a first natural language analysis to tokenize information of the one or more data sources and generate a set of multiple data source tokens

925

Perform a second natural language analysis to tokenize contents of the response and generate a set of multiple response tokens

930

Map individual data source tokens of the set of multiple data source tokens to individual response tokens of the set of multiple response tokens

935

Map one or more portions of the response to the one or more data sources of the set of multiple data sources base at least in part on the training log metadata, where mapping the one or more portions of the response to the one or more data sources is based on the mapping of the individual data source tokens to the individual response tokens

940

Transmit, to the user device, the response and one or more indications of the one or more data sources based on the mapping and the training log metadata

VALIDATING GENERATIVE ARTIFICIAL INTELLIGENCE OUTPUT

FIELD OF TECHNOLOGY

The present disclosure relates generally to database systems and data processing, and more specifically to validating generative artificial intelligence (AI) output.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud platform scenarios, a cloud platform, a server, or other device may utilize artificial intelligence (AI) models. However, such methods may be improved.

BRIEF DESCRIPTION OF THE DRAWINGS

FIGS. 8 and 9 show flowcharts illustrating methods that support validating generative AI output.

DETAILED DESCRIPTION

Figure 1:
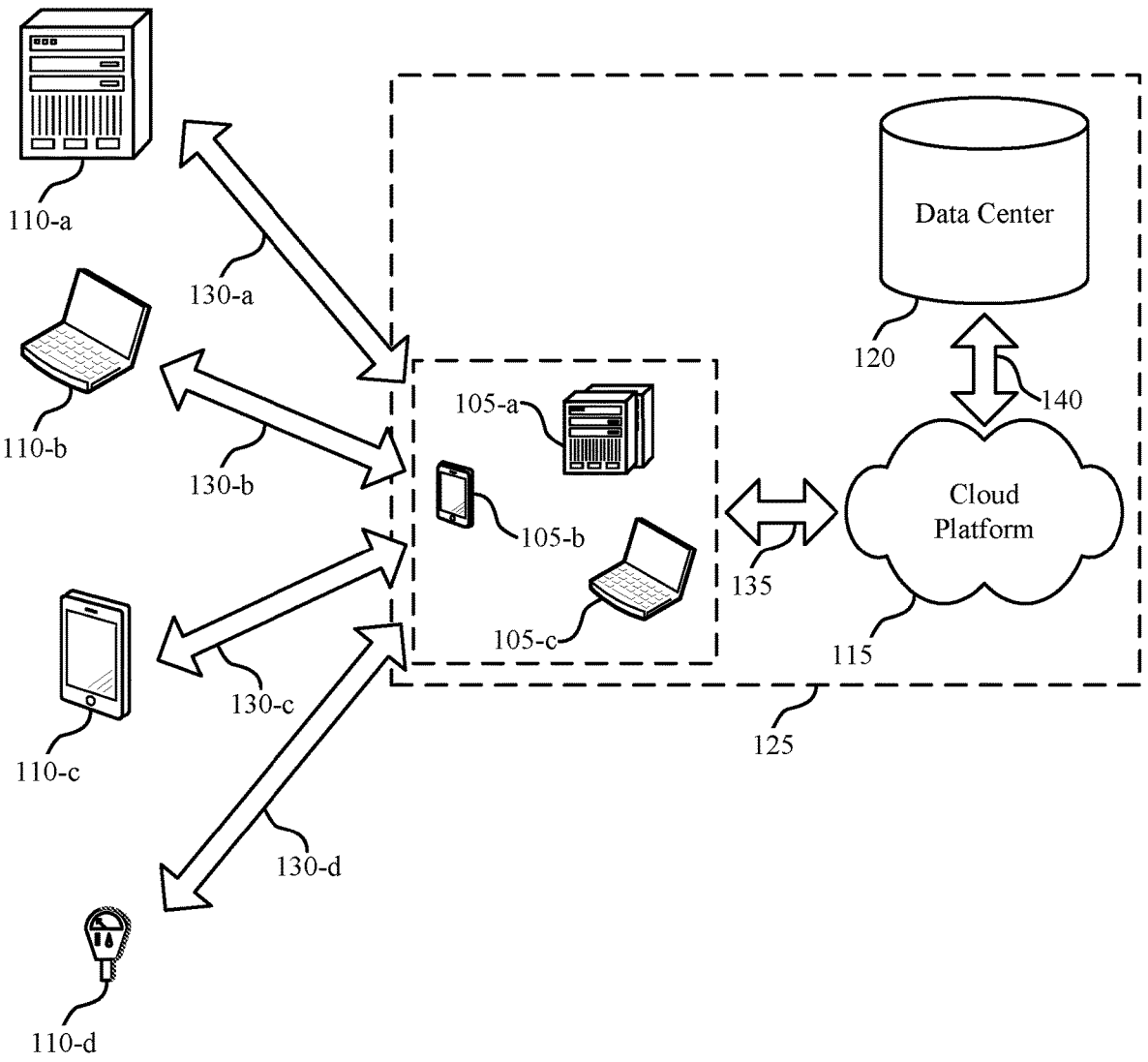
FIG. 1 illustrates an example of system for cloud computing that supports validating generative artificial intelligence (AI) output.

Generative artificial intelligence (AI) is susceptible to hallucination or other errors in the outputs generated in response to a prompt. For example, a generative AI model may be trained on a variety of sources, but, in some cases, a response given in response to a prompt may not align or agree with the sources on which the generative AI model was trained. Further, though there are existing approaches to validating the output of generative AI models, such approaches are manually intensive and may involve excessive human intervention to satisfactorily validate the generative AI output.

Thus, to reduce or eliminate hallucinations and errors in generative AI outputs, a system may track data sources that are to be used to train a generative AI model in an audit log. Such an audit log may identify (e.g., through the use of metadata) the sources included for training or may tag or tokenize one or more portions of the source. The system may transmit a query or prompt to the generative AI model and the generative AI model may produce a response to the query based on the sources on which the generative AI model was trained. The system may analyze the audit log or metadata to determine which sources (or which portions of which sources) were used to generate the response and may present a link or other identification of the sources used to a user device or other device that transmitted the query. In this way, the sources (and, optionally, which portions of the sources) used to generate the response are transparently exposed to the user, increasing trust in the generative AI model and allowing for validation of the responses.

In some examples, the system may tokenize portions of data sources and portions of the response, and a mapping may be performed between tokenized portions of the response with tokenized portions of the sources to identify associations between the generated response and the data sources with greater specificity. In some examples, the system may (e.g., through the use of one or more additional AI models, such as generative AI models or non-generative AI models) verify the response to determine whether the response is valid or not. In some examples, the system may validate the response via a comparison of the response with one or more of the data sources (e.g., utilizing an AI model, such as generative AI models or non-generative AI models). In some examples, the system may determine a confidence score in the response and may suggest or implement actions to be taken based on the confidence score meeting or failing to meet a confidence threshold (e.g., marking the response differently when the confidence is low).

Aspects of the disclosure are initially described in the context of an environment supporting an on-demand database service. Aspects of the disclosure are then described with reference to generative AI schemes, and a process flow. Aspects of the disclosure are further illustrated by and described with reference to apparatus diagrams, system diagrams, and flowcharts that relate to validating generative AI output.

FIG. 1 illustrates an example of a system 100 for cloud computing that supports validating generative AI output in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

For example, a cloud client 105 may communicate with the cloud platform 115 and the system 100 may perform one or more operations or techniques for validating the output of a generative AI. The cloud platform 115 may train the generative AI and may store (e.g., in metadata) one or more indications of which data sources or which portions of such data sources were used to train the generative AI. For example, the cloud platform 115 may store, at various points along a training path, when such portions or entire data sources are used to train the generative AI. A cloud client

105 may transmit a query to the cloud platform 115 to generate a response using the generative AI. The cloud platform 115 may transmit the query to the generative AI and receive the response. The cloud platform 115 may perform a mapping between the response and the data sources using the metadata, natural language processing techniques, or any combination thereof and may transmit indications of the mapping, the data sources, one or more portions of data sources, or any combination thereof to the cloud client 105 in association with transmitting the response to the cloud client 105. In this way, improved validation of generative AI outputs may be achieved.

In other approaches, AI (e.g., generative AI) may, at times, hallucinate or introduce other errors in the outputs generated in response to a prompt. For example, a generative AI model may be trained on a variety of sources or may refer to a variety of data sources to generate responses. However, in some cases, one or more portions of a response to a prompt may not be in accordance with the sources on which the generative AI model was trained or that were referred to. Further, some approaches to validating such output are manually intensive and may involve excessive human intervention to satisfactorily validate the generative AI output.

The subject matter described herein includes techniques to identify, determine, reduce, or eliminate hallucinations and errors in generative AI outputs. For example, a system may track data sources that are to be used to train a generative AI model (e.g., using metadata). Such metadata may identify, store, determine, or otherwise obtain indications of the sources included for training or may tag or tokenize one or more portions of the source. Thus, the system may, in connection with transmitting the response from the generative AI model, provide indications of one or more data sources from which the response was generated (e.g., data sources used for training the generative AI, for producing the response, or both). In this way, the sources (and, optionally, which portions of the sources) used to generate the response are transparently exposed to the user, increasing trust in the generative AI model and allowing for validation of the responses.

For example, a user may transmit a query to generate a response with a generative AI. The system may have previously tracked or stored (e.g., in metadata) which data sources were used to train the generative AI (e.g., before receiving the query to generate the response). The generative AI may process the query and provide the response to the system. The system may then identify (e.g., using the metadata) which data sources were used or were otherwise relevant to generating the response using the metadata, which may store information about which data sources were used for training the generative AI or for generating the response to the query. The system may provide the response and the indications of the relevant data sources to the user (e.g., for further processing to verify or validate the response or for the user to verify or validate the response).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
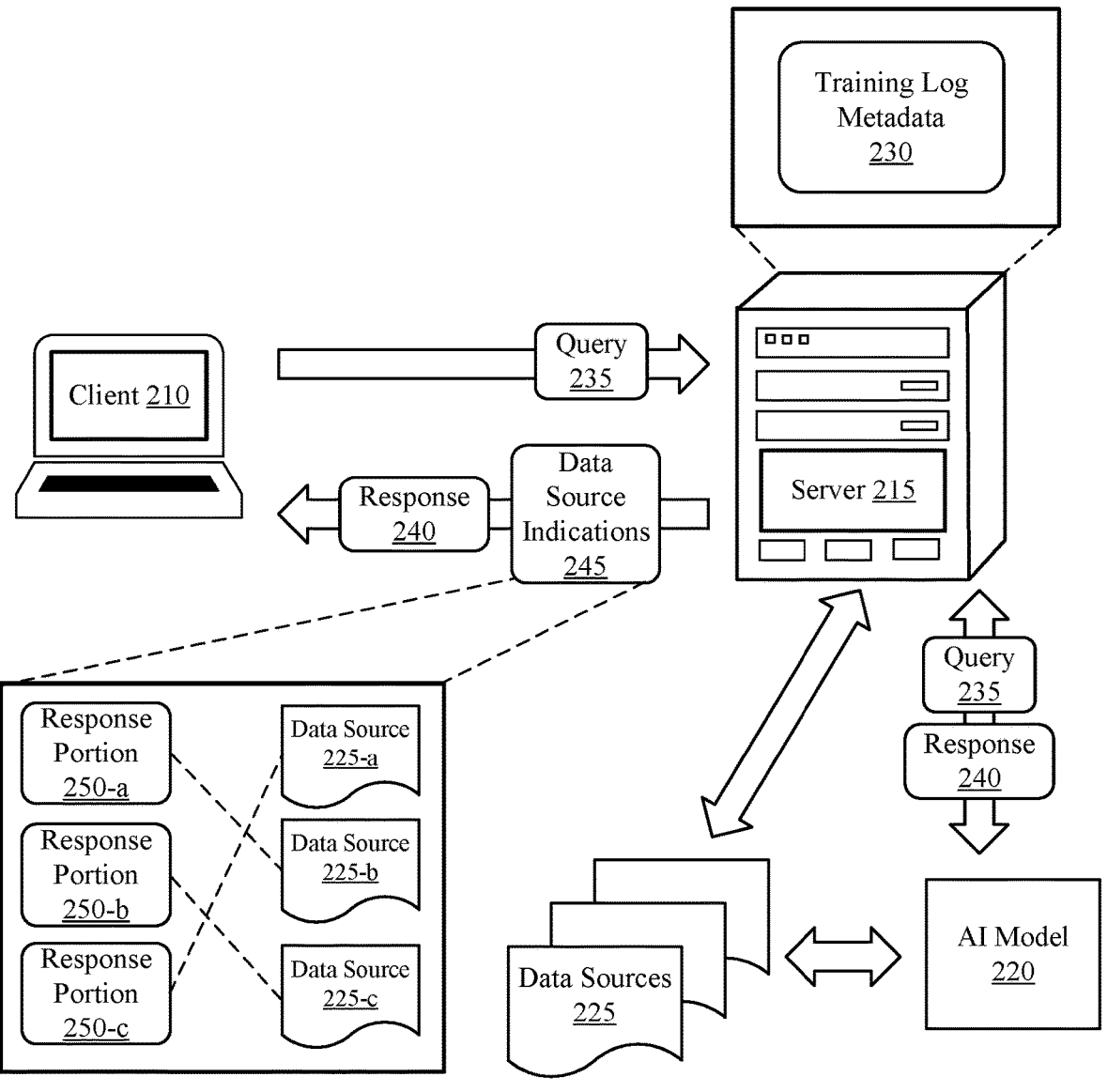
FIG. 2 shows an example of a generative AI scheme that supports validating generative AI output.

FIG. 2 shows an example of a generative AI scheme 200 that supports validating generative AI output. Though some devices and operations are shown or described in examples, different devices may perform some or all of the operations or techniques described herein.

The generative AI scheme 200 may include a client that communicates with a server 215. The server 215 may be an application server or any other device capable of performing one or more of the techniques described herein. For example, the server 215 may operate on a cloud platform, either individually or in concert with one or more other devices. The server 215 may communicate with the client 210, an AI model 220 (or multiple such AI models 220), data sources 225 (e.g., one or more such data sources 225), or any combination thereof.

In some examples, the server 215 may train the AI model 220. For example, the server 215 may aid in training the 220 using the data sources 225. The data sources 225 may be publicly-accessible data sources, private data sources, or any combination thereof. In some examples, the server 215 may generate the training log metadata 230 during such a training process. For example, the server 215 may record which data sources 225 are used to train the AI model 220, an order of data sources 225 used, which portions of the data sources 225 are used, identifiers associated with the data sources 225 used, other information associated with the data sources 225, or any combination thereof. In some examples, such training log metadata 230 may be generated or stored in association with one or more interfaces or programs for generating execution flows for a cloud platform. For example, a user may employ a program or interface for generating different execution flows, data connections, or other cloud computing operations, and the training log metadata 230 or other similar data may be stored within the program or interface or in a format that may be compatible with the program or interface.

In some examples, the server 215 may receive the query 235 from the client 210. The query 235 may include a request for the AI model 220 to generate a response 240 to the query 235. In some examples, the server 215 may transmit the query 235 to the AI model 220 and the AI model 220 may generate the response 240 and transmit the response 240 to the server 215.

In response to receiving the response 240, the server 215 may map one or more portions of the response 240 to one or more portions of the data sources 225 based on the training log metadata 230. For example, the AI model 220 may be trained on one or more data sources 225 that include cooking techniques. The query 235 may include a request for instructions to make scrambled eggs. The AI model 220 may generate the response 240 with instructions to make scrambled eggs using one or more of the data sources 225, and the server 215 may identify, using the training log metadata 230, which data sources 225 were employed to train the AI model 220, generate the response 240, or both. The server 215 may further map one or more portions of the instructions for making scrambled eggs to one or more of the data sources 225. For example, a response portion 250-a regarding seasoning the eggs may be from or associated with a first data source 225-a, a response portion 250-b regarding a temperature for cooking the eggs, may be from or associated with a second data source 225-b, and a response portion 250-c regarding an amount of time for cooking the eggs may be associated with a third data source 225-c. Such a mapping or one or more portions thereof may be used to generate the data source indications 245, which may be transmitted to the client 210 in association with the response 240.

In some examples, to determine the mapping between the response portions 250 and the data sources 225 the server 215 may reinvoke one or more processes by which the AI model 220 was initially trained and retrace the training procedure through such processes to discover or generate the associations between the response portions 250 and the data sources 225. In some examples, such reinvocation and retracing may be performed within or in association with the program or interface for generating cloud computing execution flows, data connections, or other cloud computing operations.

Figure 3:
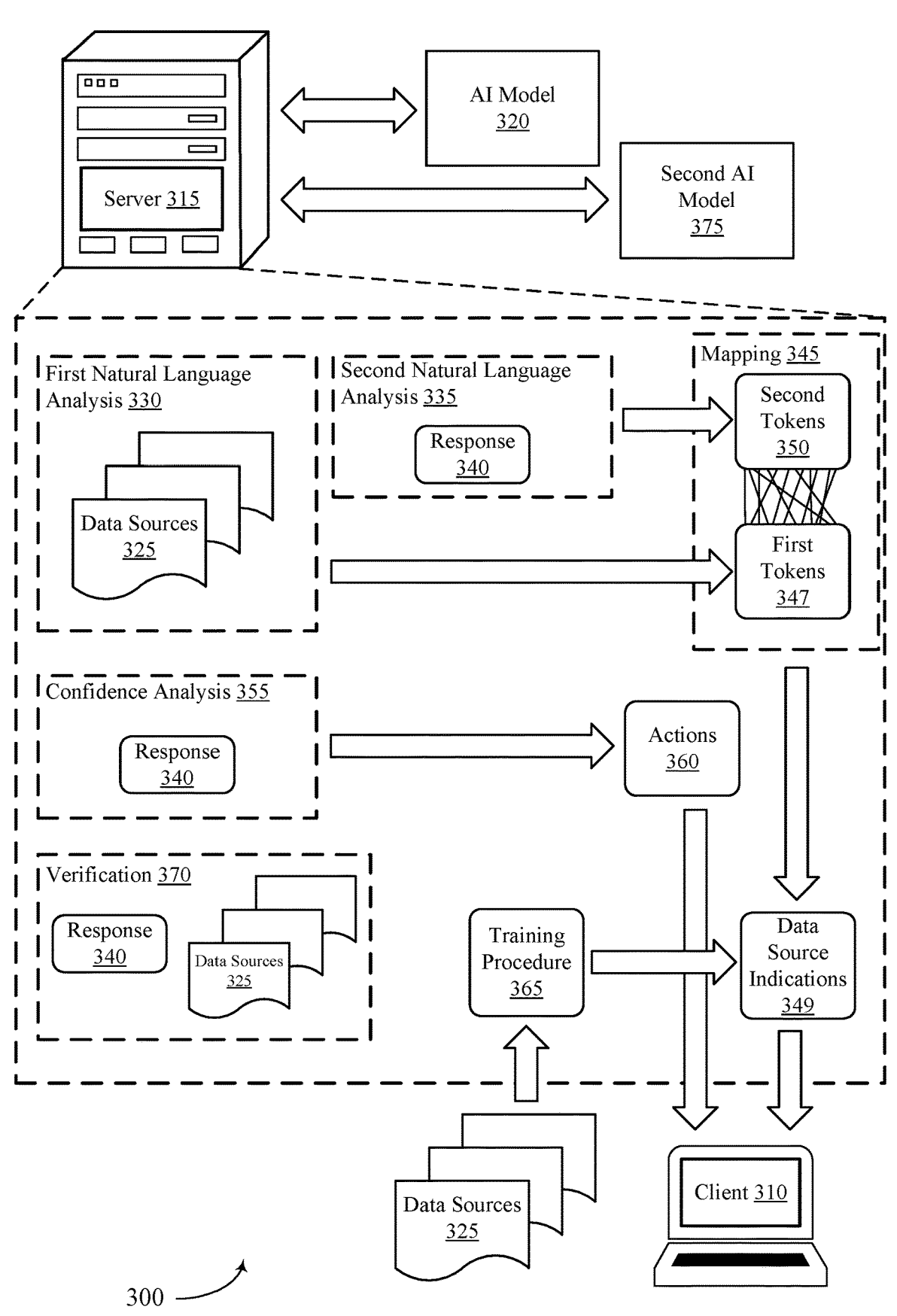
FIG. 3 shows an example of a generative AI scheme that supports validating generative AI output.

FIG. 3 shows an example of a generative AI scheme 300 that supports validating generative AI output. The generative AI scheme 300 may include or be associated with a server 315, an AI model 320, a second AI model 375, or any combination thereof, which may perform, individually or in concert, one or more operations implementing the techniques described herein. In some examples, the operations or techniques described herein may be performed using the AI model 320, the second AI model 375, one or more other models or device, or any combination thereof.

In some examples, the server 315 may employ the use of metadata or other records to provide an indication of one or more data sources 325 or one or more portions thereof that were used to train the AI model 320, the second AI model 375, or both, or to generate the response 340 to the query sent by the client 310. Such an indication, the metadata itself, or both may be generated or obtained using one or more techniques as described herein.

For example, the server 315 may perform a first natural language analysis 330 of one or more one or more data sources 325 to tokenize one or more portions of the one or more data sources 325 and generate the first tokens 347. Additionally, or alternatively, the server 315 may perform a second natural language analysis 335 on one or more portions of the response 340 to tokenize one or more portions of the response 340 and generate the second tokens 350. The server 315 may then perform a mapping 345 between the first tokens 347 and the second tokens 350 to determine which of the first tokens 347 are associated with the second tokens 350, are the same as the second tokens 350, satisfy one or more similarity thresholds associated with the second tokens 350, or any combination thereof. The mapping 345 may serve as a basis for generating, producing, identifying, or obtaining the data source indications 349 that may be transmitted to the client 310 in association with the response 340 generated by the AI model 320.

In some examples, the server 315 may perform a confidence analysis 355 to analyze the response 340 to determine a confidence score associated with the response 340. Such a confidence score may represent a confidence or probability that the response 340 is responsive to the query, that the response 340 includes information that is correct (or aligns with information in the data sources 325), or any combination thereof. In some examples, the server 315 may further determine one or more actions 360 that are to be taken (e.g., based on whether the confidence score satisfies one or more confidence thresholds associated with one or more actions). For example, if the confidence score does not satisfy a confidence threshold, the server 315 may not perform one or more actions associated with the confidence threshold. Similarly, if the confidence score does satisfy a confidence threshold, the server 315 may perform one or more actions associated with the confidence threshold. Such actions could be any actions that could be performed by a cloud computing platform or a server 315. For example, if, as a result of the confidence analysis 355, the server 315 determines that the response 340 is not responsive to the query, the server 315 may not transmit the response 340, the mapping 345, or both to the client, and may instead transmit an indication that the response 340 from the AI model 320 was not satisfactory. Further, the server 315 may then determine to switch operation to the second AI model 375 for further query processing or perform one or more other actions to remedy the unsatisfactory results.

In some examples, the server 315 may receive an indication of the one or more data sources 325 (e.g., from a user or the client 310). The server 315 may generate a training procedure 365 for training the AI model 320, the second AI model 375, or both, based on the indications of the data sources 325. For example, the server 315 may include one or more data sources indicated by the client 310 in the training procedure, but may exclude other data sources not indicated by the client 310 in the training procedure.

In some examples, the server 315 may perform the verification 370. As part of the verification 370, the server 315 may analyze the response 340, the one or more data sources 325, or any combination thereof, to determine whether the response 340 is responsive to the query, whether the response 340 correctly includes information included in the one or more data sources 325, or any combination thereof. In some examples, the server 315 may employ the second AI model 375 to perform one or more aspects of the verification 370.

In some examples, the mapping 345 may include one or more data sources identifiers, one or more data source location, one or more web addresses, one or more excerpts from the one or more data sources (e.g., that may include or be based on the mapping 345, the second tokens 350, the first tokens 347, or any combination thereof), or any combination thereof.

Figure 4:
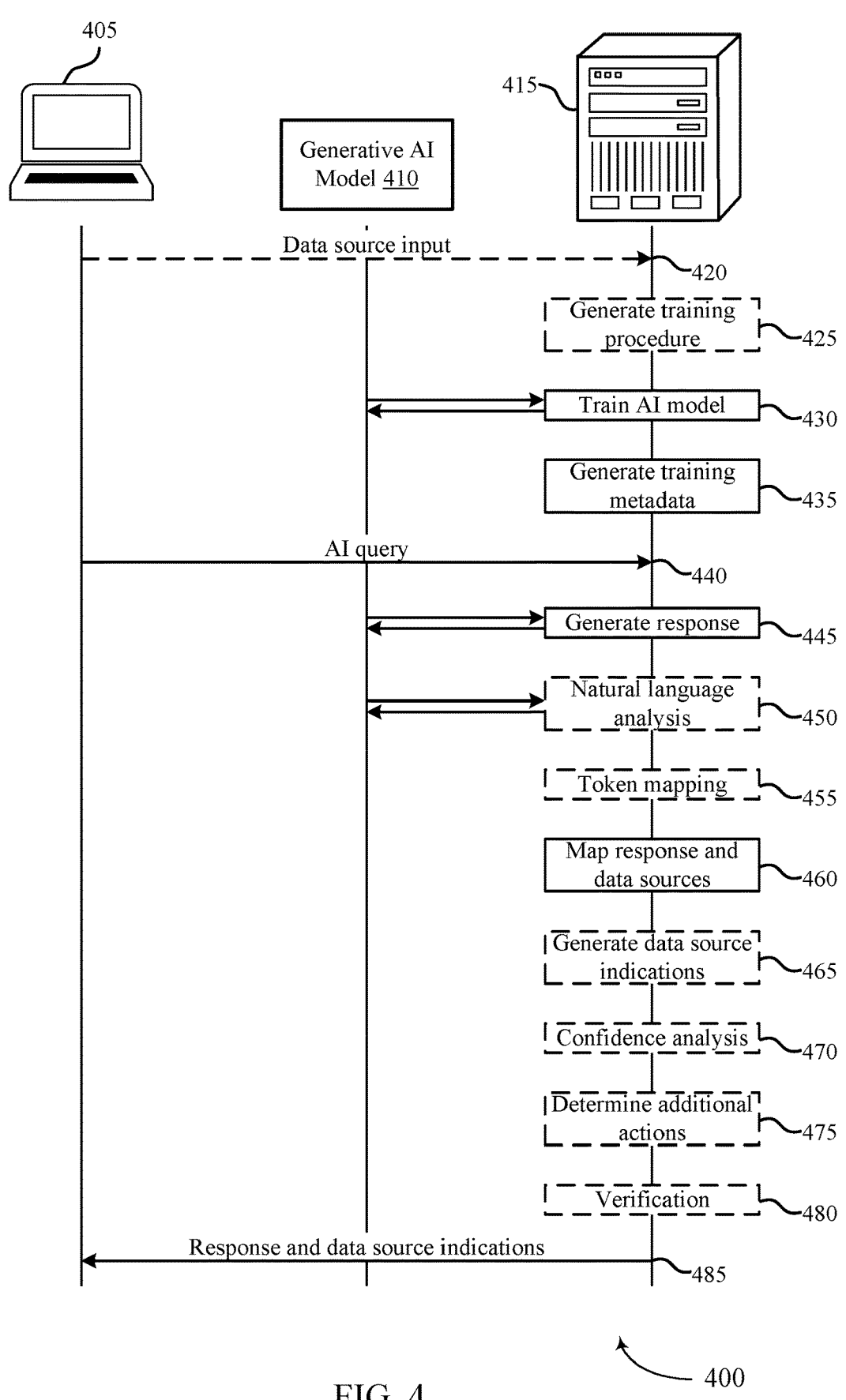
FIG. 4 shows an example of a process flow that supports validating generative AI output.

FIG. 4 shows an example of a process flow 400 that supports validating generative AI output. The process flow 400 may implement various aspects of the present disclosure described herein. The elements described in the process flow 400 (e.g., client 405, generative AI model 410, and server 415) may be examples of similarly named elements described herein.

In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

At 420, the server 415 may receive user input indicating the plurality of data sources.

At 425, the server 415 may generate a training procedure for the generative AI model 410, the training procedure indicating the plurality of data sources.

At 430, the server 415 may train the generative AI model 410 on a plurality of data sources. In some examples, training the generative AI model 410 is based on the training procedure.

At 435, the server 415 may generate, based on the training, training log metadata indicating individual data sources of the plurality of data sources.

At 440, the server 415 may receive, from a user device, a generative AI query.

At 445, the server 415 may generate, using the trained generative AI model 410 and based on one or more data sources of the plurality of data sources, a response to the generative AI query.

At 450, the server 415 may perform a first natural language analysis to tokenize information of the one or more data sources and generate a plurality of data source tokens. Additionally, or alternatively, the server 415 may perform a second natural language analysis to tokenize contents of the response and generate a plurality of response tokens.

At 455, the server 415 may map individual data source tokens of the plurality of data source tokens to individual response tokens of the plurality of response tokens.

At 460, the server 415 may map one or more portions of the response to the one or more data sources of the plurality of data sources based a on the training log metadata. In some examples, the mapping of the one or more portions of the response to the one or more data sources is based on the mapping of the individual data source tokens to the individual response tokens.

At 465, the server 415 may generate the one or more indications of the one or more data sources based on the mapping of the individual data source tokens to the individual response tokens. In some examples, the server 415 may generate the one or more indications of the one or more data sources based on the training procedure. In some examples, the one or more indications of the one or more data sources comprise a data source identifier, a data source location, a web address, an excerpt from the one or more data sources, or any combination thereof.

At 470, the server 415 may analyze the response to determine a confidence score associated with the response.

At 475, the server 415 may determine one or more actions to be performed based on the confidence score satisfying a confidence score threshold or determining one or more actions to be performed based on the confidence score failing to satisfy the confidence score threshold.

At 480, the server 415 may verify, with a second generative AI model 410 and based on the response, that the response is responsive to the generative AI query. Additionally, or alternatively, the server 415 may analyze the response and the one or more data sources to determine whether the response correctly includes information included in the one or more data sources.

At 485, the server 415 may transmit, to the user device, the response and one or more indications of the one or more data sources based on the mapping and the training log metadata. In some examples, the one or more indications of the one or more data sources comprise a data source identifier, a data source location, a web address, an excerpt from the one or more data sources, or any combination thereof.

Figure 5:
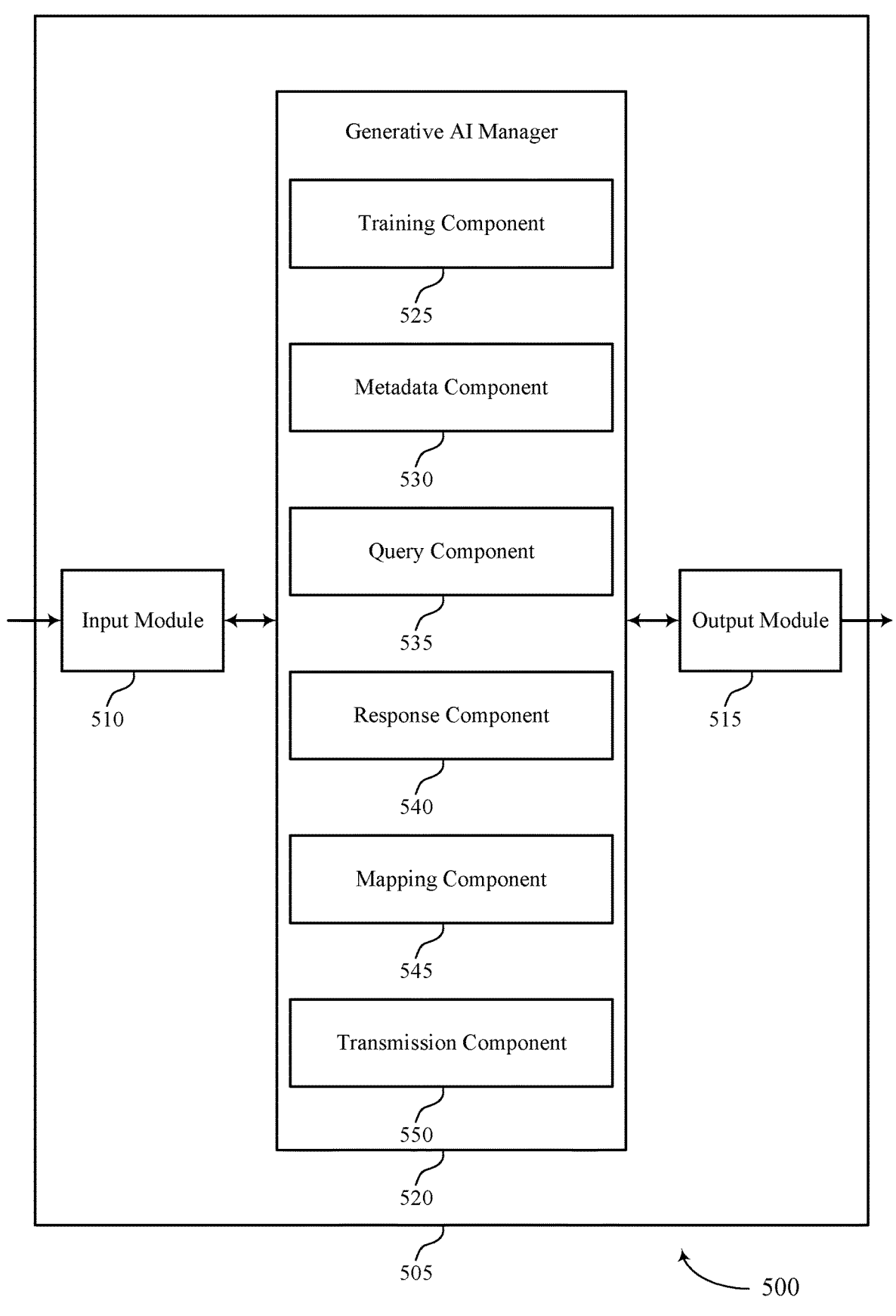
FIG. 5 shows a block diagram of an apparatus that supports validating generative AI output.

FIG. 5 shows a block diagram 500 of a device 505 that supports validating generative AI output. The device 505 may include an input module 510, an output module 515, and a generative AI manager 520. The device 505, or one or more components of the device 505 (e.g., the input module 510, the output module 515, and the generative AI manager 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the generative AI manager 520 to support validating generative AI output. In some cases, the input module 510 may be a component of an input/output (I/O) controller 710 as described with reference to FIG. 7.

The output module 515 may manage output signals for the device 505. For example, the output module 515 may receive signals from other components of the device 505, such as the generative AI manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the generative AI manager 520 may include a training component 525, a metadata component 530, a query component 535, a response component 540, a mapping component 545, a transmission component 550, or any combination thereof. In some examples, the generative AI manager 520, or various components thereof, may be configured to perform various operations (e.g., receiving, monitoring, transmitting) using or otherwise in cooperation with the input module 510, the output module 515, or both. For example, the generative AI manager 520 may receive information from the input module 510, send information to the output module 515, or be integrated in combination with the input module 510, the output module 515, or both to receive information, transmit information, or perform various other operations as described herein.

The generative AI manager 520 may support analyzing a generative artificial intelligence (AI) model in accordance with examples as disclosed herein. The training component 525 may be configured to support training the generative AI model on a set of multiple data sources. The metadata component 530 may be configured to support generating, based on the training, training log metadata indicating individual data sources of the set of multiple data sources. The query component 535 may be configured to support receiving, from a user device, a generative AI query. The response component 540 may be configured to support generating, using the trained generative AI model and based on one or more data sources of the set of multiple data sources, a response to the generative AI query. The mapping component 545 may be configured to support mapping one or more portions of the response to the one or more data sources of the set of multiple data sources based on the training log metadata. The transmission component 550 may be configured to support transmitting, to the user device, the response and one or more indications of the one or more data sources based on the mapping and the training log metadata.

Figure 6:
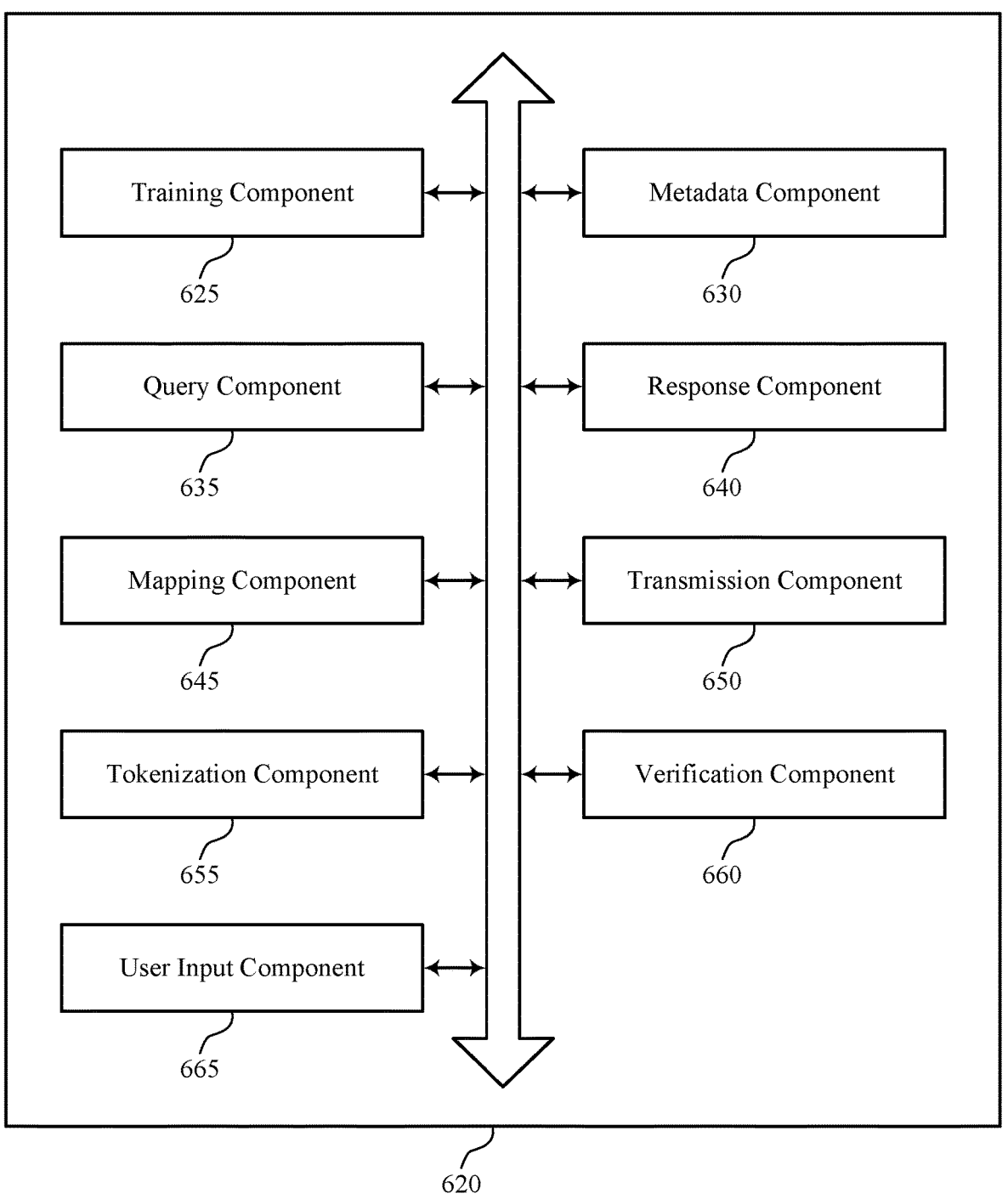
FIG. 6 shows a block diagram of a generative AI manager that supports validating generative AI output.

FIG. 6 shows a block diagram 600 of a generative AI manager 620 that supports validating generative AI output. The generative AI manager 620 may be an example of aspects of a generative AI manager or a generative AI manager 520, or both, as described herein. The generative AI manager 620, or various components thereof, may be an example of means for performing various aspects of validating generative AI output as described herein. For example, the generative AI manager 620 may include a training component 625, a metadata component 630, a query component 635, a response component 640, a mapping component 645, a transmission component 650, a tokenization component 655, a verification component 660, a user input component 665, or any combination thereof. Each of these components, or components of subcomponents thereof (e.g., one or more processors, one or more memories), may communicate, directly or indirectly, with one another (e.g., via one or more buses).

The generative AI manager 620 may support analyzing a generative artificial intelligence (AI) model in accordance with examples as disclosed herein. The training component 625 may be configured to support training the generative AI model on a set of multiple data sources. The metadata component 630 may be configured to support generating, based on the training, training log metadata indicating individual data sources of the set of multiple data sources. The query component 635 may be configured to support receiving, from a user device, a generative AI query. The response component 640 may be configured to support generating, using the trained generative AI model and based on one or more data sources of the set of multiple data sources, a response to the generative AI query. The mapping component 645 may be configured to support mapping one or more portions of the response to the one or more data sources of the set of multiple data sources based on the training log metadata. The transmission component 650 may be configured to support transmitting, to the user device, the response and one or more indications of the one or more data sources based on the mapping and the training log metadata.

In some examples, the tokenization component 655 may be configured to support performing a first natural language analysis to tokenize information of the one or more data sources and generate a set of multiple data source tokens. In some examples, the tokenization component 655 may be configured to support performing a second natural language analysis to tokenize contents of the response and generate a set of multiple response tokens. In some examples, the mapping component 645 may be configured to support mapping individual data source tokens of the set of multiple data source tokens to individual response tokens of the set of multiple response tokens. In some examples, the mapping component 645 may be configured to support where mapping the one or more portions of the response to the one or more data sources is based on the mapping of the individual data source tokens to the individual response tokens.

In some examples, the mapping component 645 may be configured to support generating the one or more indications of the one or more data sources based on the mapping of the individual data source tokens to the individual response tokens.

In some examples, the verification component 660 may be configured to support analyzing the response to determine a confidence score associated with the response. In some examples, the verification component 660 may be configured to support determining one or more actions to be performed based on the confidence score satisfying a confidence score threshold or determining one or more actions to be performed based on the confidence score failing to satisfy the confidence score threshold.

In some examples, the user input component 665 may be configured to support receiving user input indicating the set of multiple data sources. In some examples, the training component 625 may be configured to support generating a training procedure for the generative AI model, the training procedure indicating the set of multiple data sources. In some examples, the training component 625 may be configured to support where training the generative AI model is based on the training procedure.

In some examples, the training component 625 may be configured to support generating the one or more indications of the one or more data sources based on the training procedure.

In some examples, the verification component 660 may be configured to support verifying, with a second generative AI model and based on the response, that the response is responsive to the generative AI query.

In some examples, the verification component 660 may be configured to support analyzing the response and the one or more data sources to determine whether the response correctly includes information included in the one or more data sources.

In some examples, the one or more indications of the one or more data sources include a data source identifier, a data source location, a web address, an excerpt from the one or more data sources, or any combination thereof.

Figure 7:
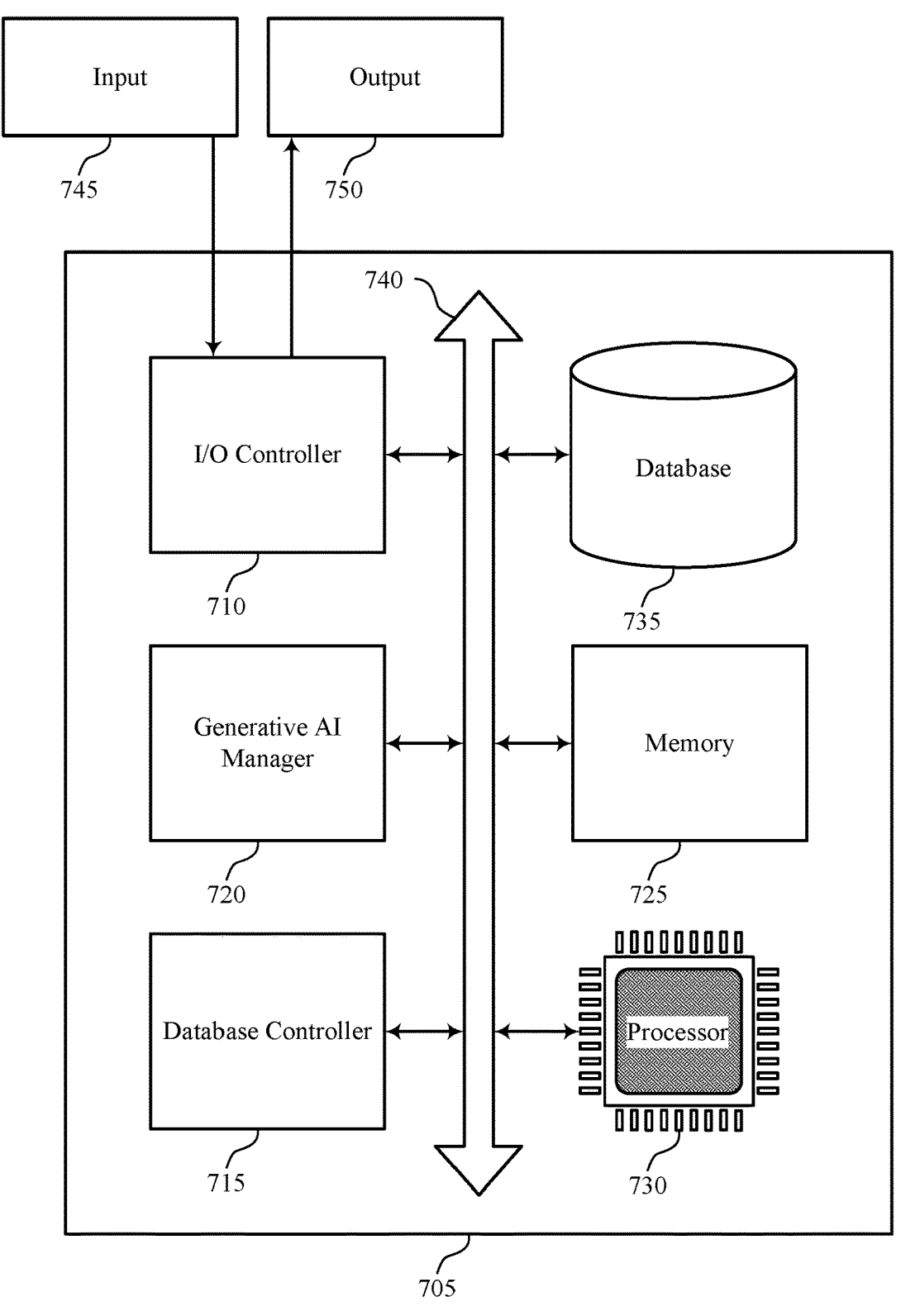
FIG. 7 shows a diagram of a system including a device that supports validating generative AI output.

FIG. 7 shows a diagram of a system 700 including a device 705 that supports validating generative AI output. The device 705 may be an example of or include the components of a device 505 as described herein. The device 705 may include components for bi-directional data communications including components for transmitting and receiving communications, such as a generative AI manager 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting validating generative AI output). The processor 730 may be an example of a single processor or multiple processors. For example, the device 705 may include one or more processors 730.

The generative AI manager 720 may support analyzing a generative artificial intelligence (AI) model in accordance with examples as disclosed herein. For example, the generative AI manager 720 may be configured to support training the generative AI model on a set of multiple data sources. The generative AI manager 720 may be configured to support generating, based on the training, training log metadata indicating individual data sources of the set of multiple data sources. The generative AI manager 720 may be configured to support receiving, from a user device, a generative AI query. The generative AI manager 720 may be configured to support generating, using the trained generative AI model and based on one or more data sources of the set of multiple data sources, a response to the generative AI query. The generative AI manager 720 may be configured to support mapping one or more portions of the response to the one or more data sources of the set of multiple data sources based on the training log metadata. The generative AI manager 720 may be configured to support transmitting, to the user device, the response and one or more indications of the one or more data sources based on the mapping and the training log metadata.

By including or configuring the generative AI manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 8:
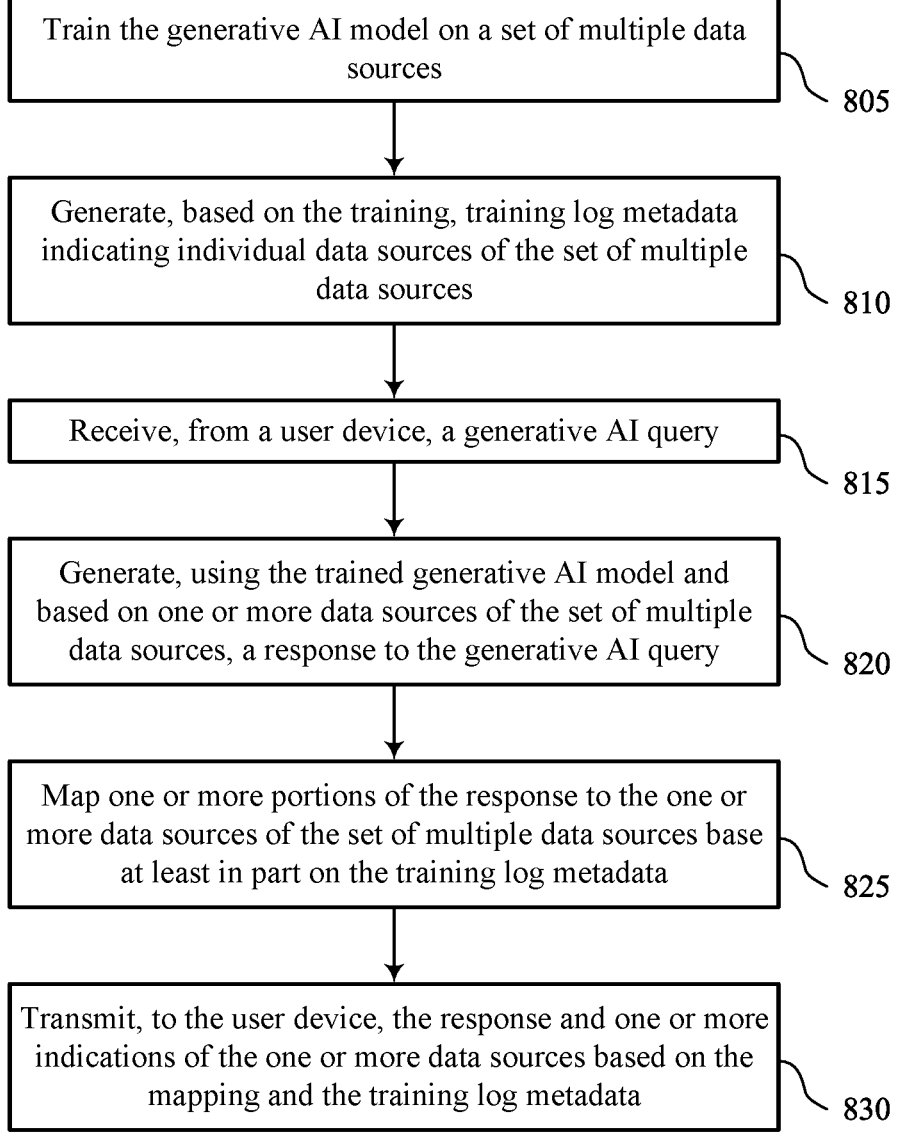

FIG. 8 shows a flowchart illustrating a method 800 that supports validating generative AI output. The operations of the method 800 may be implemented by an application server or its components as described herein. For example, the operations of the method 800 may be performed by an application server as described with reference to FIGS. 1 through 7. In some examples, an application server may execute a set of instructions to control the functional elements of the application server to perform the described functions. Additionally, or alternatively, the application server may perform aspects of the described functions using special-purpose hardware.

At 805, the method may include training the generative AI model on a set of multiple data sources. The operations of block 805 may be performed in accordance with examples as disclosed herein. In some examples, aspects of the operations of 805 may be performed by a training component 625 as described with reference to FIG. 6.

At 810, the method may include generating, based on the training, training log metadata indicating individual data sources of the set of multiple data sources. The operations of block 810 may be performed in accordance with examples as disclosed herein. In some examples, aspects of the operations of 810 may be performed by a metadata component 630 as described with reference to FIG. 6.

At 815, the method may include receiving, from a user device, a generative AI query. The operations of block 815 may be performed in accordance with examples as disclosed herein. In some examples, aspects of the operations of 815 may be performed by a query component 635 as described with reference to FIG. 6.

At 820, the method may include generating, using the trained generative AI model and based on one or more data sources of the set of multiple data sources, a response to the generative AI query. The operations of block 820 may be performed in accordance with examples as disclosed herein. In some examples, aspects of the operations of 820 may be performed by a response component 640 as described with reference to FIG. 6.

At 825, the method may include mapping one or more portions of the response to the one or more data sources of the set of multiple data sources based on the training log metadata. The operations of block 825 may be performed in accordance with examples as disclosed herein. In some examples, aspects of the operations of 825 may be performed by a mapping component 645 as described with reference to FIG. 6.

At 830, the method may include transmitting, to the user device, the response and one or more indications of the one or more data sources based on the mapping and the training log metadata. The operations of block 830 may be performed in accordance with examples as disclosed herein. In some examples, aspects of the operations of 830 may be performed by a transmission component 650 as described with reference to FIG. 6.

FIG. 9 shows a flowchart illustrating a method 900 that supports validating generative AI output. The operations of the method 900 may be implemented by an application server or its components as described herein. For example, the operations of the method 900 may be performed by an application server as described with reference to FIGS. 1 through 7. In some examples, an application server may execute a set of instructions to control the functional elements of the application server to perform the described functions. Additionally, or alternatively, the application server may perform aspects of the described functions using special-purpose hardware.

At 905, the method may include training the generative AI model on a set of multiple data sources. The operations of block 905 may be performed in accordance with examples as disclosed herein. In some examples, aspects of the operations of 905 may be performed by a training component 625 as described with reference to FIG. 6.

At 910, the method may include generating, based on the training, training log metadata indicating individual data sources of the set of multiple data sources. The operations of block 910 may be performed in accordance with examples as disclosed herein. In some examples, aspects of the operations of 910 may be performed by a metadata component 630 as described with reference to FIG. 6.

At 915, the method may include receiving, from a user device, a generative AI query. The operations of block 915 may be performed in accordance with examples as disclosed herein. In some examples, aspects of the operations of 915 may be performed by a query component 635 as described with reference to FIG. 6.

At 920, the method may include generating, using the trained generative AI model and based on one or more data sources of the set of multiple data sources, a response to the generative AI query. The operations of block 920 may be performed in accordance with examples as disclosed herein. In some examples, aspects of the operations of 920 may be performed by a response component 640 as described with reference to FIG. 6.

At 925, the method may include performing a first natural language analysis to tokenize information of the one or more data sources and generate a set of multiple data source tokens. The operations of block 925 may be performed in accordance with examples as disclosed herein. In some examples, aspects of the operations of 925 may be performed by a tokenization component 655 as described with reference to FIG. 6.

At 930, the method may include performing a second natural language analysis to tokenize contents of the response and generate a set of multiple response tokens. The operations of block 930 may be performed in accordance with examples as disclosed herein. In some examples, aspects of the operations of 930 may be performed by a tokenization component 655 as described with reference to FIG. 6.

At 935, the method may include mapping individual data source tokens of the set of multiple data source tokens to individual response tokens of the set of multiple response tokens. The operations of block 935 may be performed in accordance with examples as disclosed herein. In some examples, aspects of the operations of 935 may be performed by a mapping component 645 as described with reference to FIG. 6.

At 940, the method may include mapping one or more portions of the response to the one or more data sources of the set of multiple data sources based on the training log metadata, where mapping the one or more portions of the response to the one or more data sources is based on the mapping of the individual data source tokens to the individual response tokens. The operations of block 940 may be performed in accordance with examples as disclosed herein. In some examples, aspects of the operations of 940 may be performed by a mapping component 645 as described with reference to FIG. 6.

At 945, the method may include transmitting, to the user device, the response and one or more indications of the one or more data sources based on the mapping and the training log metadata. The operations of block 950 may be performed in accordance with examples as disclosed herein. In some examples, aspects of the operations of 950 may be performed by a transmission component 650 as described with reference to FIG. 6.

A method for analyzing a generative artificial intelligence (AI) model by an apparatus is described. The method may include training the generative AI model on a set of multiple data sources, generating, based on the training, training log metadata indicating individual data sources of the set of multiple data sources, receiving, from a user device, a generative AI query, generating, using the trained generative AI model and based on one or more data sources of the set of multiple data sources, a response to the generative AI query, mapping one or more portions of the response to the one or more data sources of the set of multiple data sources based on the training log metadata, and transmitting, to the user device, the response and one or more indications of the one or more data sources based on the mapping and the training log metadata.

An apparatus for analyzing a generative artificial intelligence (AI) model is described. The apparatus may include one or more memories storing processor executable code, and one or more processors coupled with the one or more memories. The one or more processors may individually or collectively operable to execute the code to cause the apparatus to train the generative AI model on a set of multiple data sources, generate, based on the training, training log metadata indicating individual data sources of the set of multiple data sources, receive, from a user device, a generative AI query, generate, using the trained generative AI model and based on one or more data sources of the set of multiple data sources, a response to the generative AI query, mapping one or more portions of the response to the one or more data sources of the set of multiple data sources based at least in part on the training log metadata, and transmit, to the user device, the response and one or more indications of the one or more data sources based on the mapping and the training log metadata.

Another apparatus for analyzing a generative artificial intelligence (AI) model is described. The apparatus may include means for training the generative AI model on a set of multiple data sources, means for generating, based on the training, training log metadata indicating individual data sources of the set of multiple data sources, means for receiving, from a user device, a generative AI query, means for generating, using the trained generative AI model and based on one or more data sources of the set of multiple data sources, a response to the generative AI query, means for mapping one or more portions of the response to the one or more data sources of the set of multiple data sources based on the training log metadata, and means for transmitting, to the user device, the response and one or more indications of the one or more data sources based on the mapping and the training log metadata.

A non-transitory computer-readable medium storing code for analyzing a generative artificial intelligence (AI) model is described. The code may include instructions executable by one or more processors to train the generative AI model on a set of multiple data sources, generate, based on the training, training log metadata indicating individual data sources of the set of multiple data sources, receive, from a user device, a generative AI query, generate, using the trained generative AI model and based on one or more data sources of the set of multiple data sources, a response to the generative AI query, mapping one or more portions of the response to the one or more data sources of the set of multiple data sources based at least in part on the training log metadata, and transmit, to the user device, the response and one or more indications of the one or more data sources based on the mapping and the training log metadata.

Some examples of the method, apparatus, and non-transitory computer-readable medium described herein may further include operations, features, means, or instructions for performing a first natural language analysis to tokenize information of the one or more data sources and generate a set of multiple data source tokens, performing a second natural language analysis to tokenize contents of the response and generate a set of multiple response tokens, mapping individual data source tokens of the set of multiple data source tokens to individual response tokens of the set of multiple response tokens, and where mapping the one or more portions of the response to the one or more data sources may be based on the mapping of the individual data source tokens to the individual response tokens.

Some examples of the method, apparatus, and non-transitory computer-readable medium described herein may further include operations, features, means, or instructions for generating the one or more indications of the one or more data sources based on the mapping of the individual data source tokens to the individual response tokens.

Some examples of the method, apparatus, and non-transitory computer-readable medium described herein may further include operations, features, means, or instructions for analyzing the response to determine a confidence score associated with the response and determining one or more actions to be performed based on the confidence score satisfying a confidence score threshold or determining one or more actions to be performed based on the confidence score failing to satisfy the confidence score threshold.

Some examples of the method, apparatus, and non-transitory computer-readable medium described herein may further include operations, features, means, or instructions for receiving user input indicating the set of multiple data sources, generating a training procedure for the generative AI model, the training procedure indicating the set of multiple data sources, and where training the generative AI model may be based on the training procedure.

Some examples of the method, apparatus, and non-transitory computer-readable medium described herein may further include operations, features, means, or instructions for generating the one or more indications of the one or more data sources based on the training procedure.

In some examples of the method, apparatus, and non-transitory computer-readable medium described herein, verifying, with a second generative AI model and based on the response, that the response may be responsive to the generative AI query.

Some examples of the method, apparatus, and non-transitory computer-readable medium described herein may further include operations, features, means, or instructions for analyzing the response and the one or more data sources to determine whether the response correctly includes information included in the one or more data sources.

In some examples of the method, apparatus, and non-transitory computer-readable medium described herein, the one or more indications of the one or more data sources include a data source identifier, a data source location, a web address, an excerpt from the one or more data sources, or any combination thereof.

The following provides an overview of aspects of the present disclosure:

Aspect 1: A method for analyzing a generative artificial intelligence (AI) model, comprising: training the generative AI model on a plurality of data sources; generating, based at least in part on the training, training log metadata indicating individual data sources of the plurality of data sources; receiving, from a user device, a generative AI query; generating, using the trained generative AI model and based at least in part on one or more data sources of the plurality of data sources, a response to the generative AI query; mapping one or more portions of the response to the one or more data sources of the plurality of data sources based at least in part on the training log metadata; and transmitting, to the user device, the response and one or more indications of the one or more data sources based at least in part on the mapping and the training log metadata.

Aspect 2: The method of aspect 1, further comprising: performing a first natural language analysis to tokenize information of the one or more data sources and generate a plurality of data source tokens; performing a second natural language analysis to tokenize contents of the response and generate a plurality of response tokens; and mapping individual data source tokens of the plurality of data source tokens to individual response tokens of the plurality of response tokens; wherein mapping the one or more portions of the response to the one or more data sources is based at least in part on the mapping of the individual data source tokens to the individual response tokens.

Aspect 3: The method of aspect 2, further comprising: generating the one or more indications of the one or more data sources based at least in part on the mapping of the individual data source tokens to the individual response tokens.

Aspect 4: The method of any of aspects 1 through 3, further comprising: analyzing the response to determine a confidence score associated with the response; and determining one or more actions to be performed based at least in part on the confidence score satisfying a confidence score threshold or determining one or more actions to be performed based at least in part on the confidence score failing to satisfy the confidence score threshold.

Aspect 5: The method of any of aspects 1 through 4, further comprising: receiving user input indicating the plurality of data sources; and generating a training procedure for the generative AI model, the training procedure indicating the plurality of data sources; wherein training the generative AI model is based at least in part on the training procedure.

Aspect 6: The method of aspect 5, further comprising: generating the one or more indications of the one or more data sources based at least in part on the training procedure.

Aspect 7: The method of any of aspects 1 through 6, further comprising: verifying, with a second generative AI model and based at least in part on the response, that the response is responsive to the generative AI query.

Aspect 8: The method of any of aspects 1 through 7, further comprising: analyzing the response and the one or more data sources to determine whether the response correctly includes information included in the one or more data sources.

Aspect 9: The method of any of aspects 1 through 8, wherein the one or more indications of the one or more data sources comprise a data source identifier, a data source location, a web address, an excerpt from the one or more data sources, or any combination thereof.

Aspect 10: An apparatus for analyzing a generative artificial intelligence (AI) model, comprising one or more memories storing processor-executable code, and one or more processors coupled with the one or more memories and individually or collectively operable to execute the code to cause the apparatus to perform a method of any of aspects 1 through 9.

Aspect 11: An apparatus for analyzing a generative artificial intelligence (AI) model, comprising at least one means for performing a method of any of aspects 1 through 9.

Aspect 12: A non-transitory computer-readable medium storing code for analyzing a generative artificial intelligence (AI) model, the code comprising instructions executable by one or more processors to perform a method of any of aspects 1 through 9.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for analyzing a generative artificial intelligence (AI) model, comprising:

training the generative AI model on a plurality of data sources;

generating, based at least in part on the training, training log metadata indicating individual data sources of the plurality of data sources;

receiving, from a user device, a generative AI query;

generating, using the trained generative AI model and based at least in part on one or more data sources of the plurality of data sources, a response to the generative AI query;

performing a first natural language analysis to tokenize information of the one or more data sources and generate a plurality of data source tokens;

performing a second natural language analysis to tokenize contents of the response and generate a plurality of response tokens;

mapping individual data source tokens of the plurality of data source tokens to individual response tokens of the plurality of response tokens;

mapping, based at least in part on the mapping of the individual data source tokens to the individual response tokens, one or more portions of the response to the one or more data sources of the plurality of data sources based at least in part on the training log metadata; and transmitting, to the user device, the response and one or more indications of the one or more data sources based at least in part on the mapping and the training log metadata.

2. The method of claim 1, further comprising:

generating the one or more indications of the one or more data sources based at least in part on the mapping of the individual data source tokens to the individual response tokens.

3. The method of claim 1, further comprising:

analyzing the response to determine a confidence score associated with the response; and determining one or more actions to be performed based at least in part on the confidence score satisfying a confidence score threshold or determining one or more actions to be performed based at least in part on the confidence score failing to satisfy the confidence score threshold.

4. The method of claim 1, further comprising:

receiving user input indicating the plurality of data sources; and generating a training procedure for the generative AI model, the training procedure indicating the plurality of data sources;

wherein training the generative AI model is based at least in part on the training procedure.

5. The method of claim 4, further comprising:

generating the one or more indications of the one or more data sources based at least in part on the training procedure.

6. The method of claim 1, further comprising:

verifying, with a second generative AI model and based at least in part on the response, that the response is responsive to the generative AI query.

7. The method of claim 1, further comprising:

analyzing the response and the one or more data sources to determine whether the response correctly includes information included in the one or more data sources.

8. The method of claim 1, wherein the one or more indications of the one or more data sources comprise a data source identifier, a data source location, a web address, an excerpt from the one or more data sources, or any combination thereof.

9. An apparatus for analyzing a generative artificial intelligence (AI) model, comprising:

one or more memories storing processor-executable code; and one or more processors coupled with the one or more memories and individually or collectively operable to execute the code to cause the apparatus to:

train the generative AI model on a plurality of data sources;

generate, based at least in part on the training, training log metadata indicating individual data sources of the plurality of data sources;

receive, from a user device, a generative AI query;

generate, using the trained generative AI model and based at least in part on one or more data sources of the plurality of data sources, a response to the generative AI query;

perform a first natural language analysis to tokenize information of the one or more data sources and generate a plurality of data source tokens;

perform a second natural language analysis to tokenize contents of the response and generate a plurality of response tokens;

map individual data source tokens of the plurality of data source tokens to individual response tokens of the plurality of response tokens;

map, based at least in part on the mapping of the individual data source tokens to the individual response tokens, one or more portions of the response to the one or more data sources of the plurality of data sources based at least in part on the training log metadata; and transmit, to the user device, the response and one or more indications of the one or more data sources based at least in part on the mapping and the training log metadata.

10. The apparatus of claim 9, wherein the one or more processors are individually or collectively further operable to execute the code to cause the apparatus to:

generate the one or more indications of the one or more data sources based at least in part on the mapping of the individual data source tokens to the individual response tokens.

11. The apparatus of claim 9, wherein the one or more processors are individually or collectively further operable to execute the code to cause the apparatus to:

analyze the response to determine a confidence score associated with the response; and determine one or more actions to be performed based at least in part on the confidence score satisfying a confidence score threshold or determining one or more actions to be performed based at least in part on the confidence score failing to satisfy the confidence score threshold.

12. The apparatus of claim 9, wherein the one or more processors are individually or collectively further operable to execute the code to cause the apparatus to:

receive user input indicating the plurality of data sources; and generate a training procedure for the generative AI model, the training procedure indicating the plurality of data sources;

wherein training the generative AI model is based at least in part on the training procedure.

13. The apparatus of claim 12, wherein the one or more processors are individually or collectively further operable to execute the code to cause the apparatus to:

generate the one or more indications of the one or more data sources based at least in part on the training procedure.

14. The apparatus of claim 9, wherein the one or more processors are individually or collectively further operable to execute the code to cause the apparatus to:

verify, with a second generative AI model and based at least in part on the response, that the response is responsive to the generative AI query.

15. The apparatus of claim 9, wherein the one or more processors are individually or collectively further operable to execute the code to cause the apparatus to:

analyze the response and the one or more data sources to determine whether the response correctly includes information included in the one or more data sources.

16. The apparatus of claim 9, wherein the one or more indications of the one or more data sources comprise a data source identifier, a data source location, a web address, an excerpt from the one or more data sources, or any combination thereof.

17. A non-transitory computer-readable medium storing code for analyzing a generative artificial intelligence (AI) model, the code comprising instructions executable by one or more processors to:

train the generative AI model on a plurality of data sources;

generate, based at least in part on the training, training log metadata indicating individual data sources of the plurality of data sources;

receive, from a user device, a generative AI query;

generate, using the trained generative AI model and based at least in part on one or more data sources of the plurality of data sources, a response to the generative AI query;

perform a first natural language analysis to tokenize information of the one or more data sources and generate a plurality of data source tokens;

perform a second natural language analysis to tokenize contents of the response and generate a plurality of response tokens;

map individual data source tokens of the plurality of data source tokens to individual response tokens of the plurality of response tokens;

map, based at least in part on the mapping of the individual data source tokens to the individual response tokens, one or more portions of the response to the one or more data sources of the plurality of data sources based at least in part on the training log metadata; and transmit, to the user device, the response and one or more indications of the one or more data sources based at least in part on the mapping and the training log metadata.

\* \* \* \* \*